United States Patent [19]

Nyman

[11] 4,157,190
[45] Jun. 5, 1979

[54] COUPLER WITH OPERABLE HANDLE

[75] Inventor: Oscar W. Nyman, Wausau, Wis.

[73] Assignee: The Hammerblow Corporation, Wausau, Wis.

[21] Appl. No.: 830,395

[22] Filed: Sep. 6, 1977

[51] Int. Cl.² .............................................. B60D 1/06
[52] U.S. Cl. .................................................. 280/512
[58] Field of Search ............................... 280/512, 506

[56] References Cited

U.S. PATENT DOCUMENTS

| | | | |
|---|---|---|---|
| 1,927,591 | 9/1933 | Jacob | 280/512 |
| 1,977,065 | 10/1934 | Jacob | 280/506 |
| 3,153,545 | 10/1964 | Bolmes et al. | 280/512 |
| 3,759,549 | 9/1973 | Morris | 280/512 |
| 3,820,823 | 6/1974 | Beaston | 280/512 |
| 3,880,450 | 4/1975 | Ware | 280/512 |

OTHER PUBLICATIONS

Hammer Blow Brochure Showing Bull Dog Trailer Couplers.

Primary Examiner—Robert R. Song
Attorney, Agent, or Firm—McGarry & Waters

[57] ABSTRACT

A coupler for a trailer and the like, the coupler having a body and cap hinged together at a front portion and closable along parting faces and an internal cavity formed by the body and the cap for a ball which is conventionally secured to the towing vehicle or trailer. The body is rigidly secured to a tongue portion of the coupler. The collar is mounted around the tongue portion and axially slidable over the body and a portion of the cap to latch the cap in a closed position. The collar is biased to a latching position. The body and cap are tapered so that cap snugly engages the two when the cap is in the latching position. The collar is operably coupled to an actuating handle. The handle is pivotably mounted on the tongue portion to control the movement of the collar with respect to the body and cap by movement between two rotationally displaced positions. The collar also has limited translational movement with respect to rod 22 to allow the collar to adapt to variations in thickness of the coupler due to variations in the cap, body taper, and ball size when the collar is in the latching position.

10 Claims, 5 Drawing Figures

COUPLER WITH OPERABLE HANDLE

BACKGROUND OF THE INVENTION

1. Field of the Invention

This invention relates to couplers for trailers and the like. More particularly, the invention relates to a coupler having an operable handle which moves the collar to a releasing position and a latching position with respect to the cap.

2. State of the Prior Art

Couplers have long been made so that the cap portion pivots from the front portion of the body. Jacob in U.S. Pat. Nos. 1,927,591 and 1,977,065 issued Sept. 19, 1933 and Oct. 16, 1934, respectively, discloses a trailer hitch having a cap hinged to a body at a front portion thereof. A collar is spring biased in a forward position on a rear portion of the body and releasably latches the cap in a closed position. In the U.S. Pat. No. 1,977,065, the cap has a tapered side surface against which the collar bears for a snug fit of the cap around the ball. The spring biased collar automatically adjusts the cap for slight variations in a given ball size, and for wear between the ball and the cavity in the body thereof.

On a coupler similar to the ones disclosed in the Jacob patents, a coupler handle is pivotably mounted on an upright post so that the handle pivots about a vertical axis. Pivotably attached to the handle at a point other than the pivot point of the handle, is a horizontally extending flange having a downwardly extending lip at its front end. The collar has a rear outwardly extending rim which engages the downwardly extending lip of the flange. The handle, when pivoted to a first position, draws back the flange which in turn draws back the collar to a releasing position.

In the U.S. Pat. No. 3,759,549 issued to Morris on Sept. 18, 1973, a rotatable locking sleeve is rotatably mounted about a rear portion of the body. The sleeve can be rotated to a first position to allow the cap to open and can be rotated to a locking position to close the cap around the ball. A lock is mounted on the sleeve to prevent any undesirable rotation when the sleeve is in the locking position.

SUMMARY OF THE INVENTION

According to the invention, a coupler has a body and cap hinged together at a front portion thereof. The cap and body close along parting faces thereof. Both the body and cap have internal recesses forming a cavity for the ball when the body and cap are closed along the parting faces thereof. The body is connected to an attachment means for securing the body to the frame of a vehicle or a trailer. The ball is secured to the other of the vehicle or the trailer. Typically, the attachment means extends outwardly from the frame and is called a tongue. A collar is slidably mounted on a rear portion of the body. The collar has a forward latching position and a rearwardly releasing position with respect to the cap.

A handle is movably mounted on a stationary portion of the coupler. In one embodiment, the handle is mounted on the tongue portion. The handle can be moved between a first position and a second position with respect to the tongue. Preferably, the handle is pivotably mounted to the tongue portion. Preferably, means for pivotably coupling the handle to the tongue includes a mounting flange extending transversely from the tongue and a slot through the flange. A fastener means extends through the slot to connect the handle to the mounting flange such that the fastener can also translationally move within the slot in a horizontal fashion to allow the handle to translationally move with respect to the tongue.

A rigid coupling means couples the handle to the collar to control the collar to move to a latching position and a releasing position with respect to the cap when the handle moves to the respective first and second position.

In one embodiment, the second coupling means includes a rod pivotably mounted at one end to the collar and pivotably mounted at another end to the handle. It is desirable that the collar has an outwardly extending ridge having an aperture through which the rod extends.

In another embodiment, the handle is pivotably fastened through an aperture through the flange. The collar has an outwardly extending ridge with a slot through which the rod extends. The rod has limited translational movement with respect to the collar.

The handle can be in the first position only when the collar is in the latching position. The handle can be in the second position only when the collar is in the releasing position. It is desirable that the first position is visually distinct from the second position.

In one embodiment, the collar has a means for biasing said collar to the latching position. The biasing means is operable when the handle is in the first position such that the collar automatically compensates for variations in the ball size and any variations in the taper of the body or cap.

Preferably, the biasing means also moves the collar to the latching position when the cap becomes closed such that the handle will be automatically pivoted to the first position indicating the collar is securely latching the cap to the body.

It is desirable that the handle has a means for maintaining the handle in the second position wherein an operator can free his hands from the handle and the collar will remain in the release position. In one embodiment, the maintaining means includes an aperture through the mounting flange which is capable of receiving a pin or padlock when the handle is in the second position. The aperture is positioned such that the pin or padlock abuts an edge of the handle and prevents the handle from returning to the first position against the force of the biasing means.

It is also desirable that the aperture can receive a padlock when the handle is in the first position wherein the aperture aligns with a second aperture through the handle so that the padlock can be positioned through both apertures to lock the handle in the first position and prevent unauthorized removal of the coupler from the ball.

In another embodiment, the maintaining means includes the rod pivotably mounted to the handle such that when the handle is pivoted to the second position, the rod passes through the pivotal axis of the handle. The biasing means exerts a force on the rod which in turn exerts a force on the handle in a direction to maintain the handle in the second position.

One of the important features of the invention is that the position of the handle quickly indicates whether the collar is in a releasing or latching position with respect to the cap.

Another advantage is that the collar can be maintained in a releasing position so that the cap can be easily moved between the open position and the closed position without any interference from the collar.

These and other advantages and features will hereinafter appear, and for purposes of illustration, but not of limitation, a preferred embodiment of the present invention is described in detail below and shown in the appended drawings.

DETAILED DESCRIPTION OF THE PREFERRED EMBODIMENT

Figure 1:
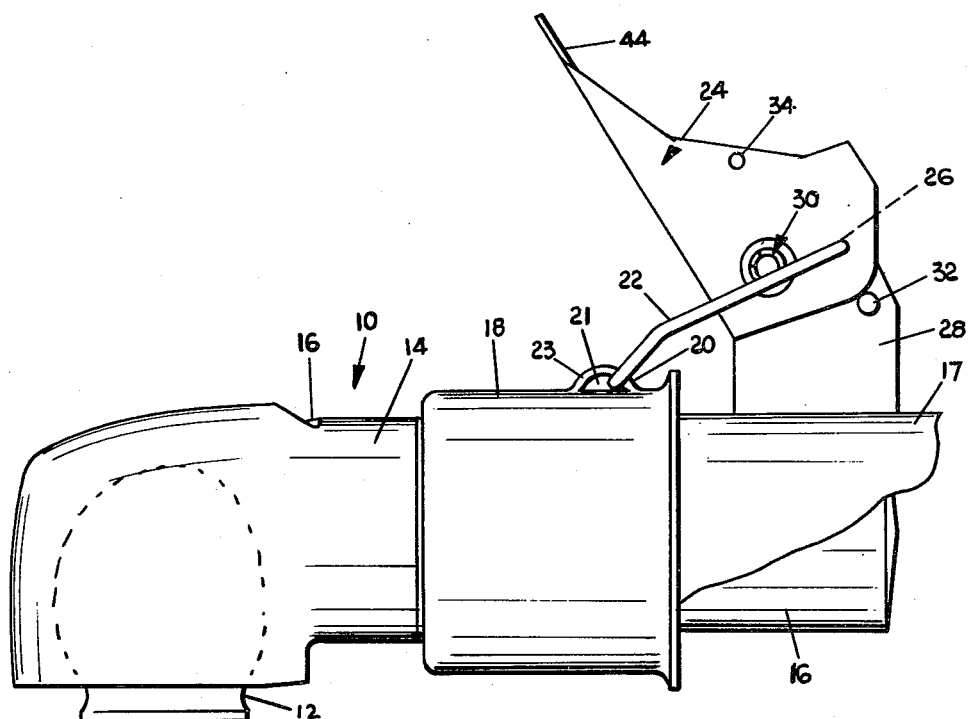
FIG. 1 is a side elevational view of the preferred embodiment of the coupler according to the invention with the handle in a second position and the body and cap enclosing a ball.

For the purposes of reference, the front of the coupler is considered to be toward the left, and the rear of the coupler is considered to be toward the right in the drawings.

Referring particularly to FIG. 1, there is shown a coupler 10 enclosing a conventional ball 12. The coupler is formed from a cap 14 and a body 16 as more clearly shown in FIGS. 2 and 4. The cap 14 is pivotably hinged to the body at the front portion thereof through a pin 15.

Figure 4:
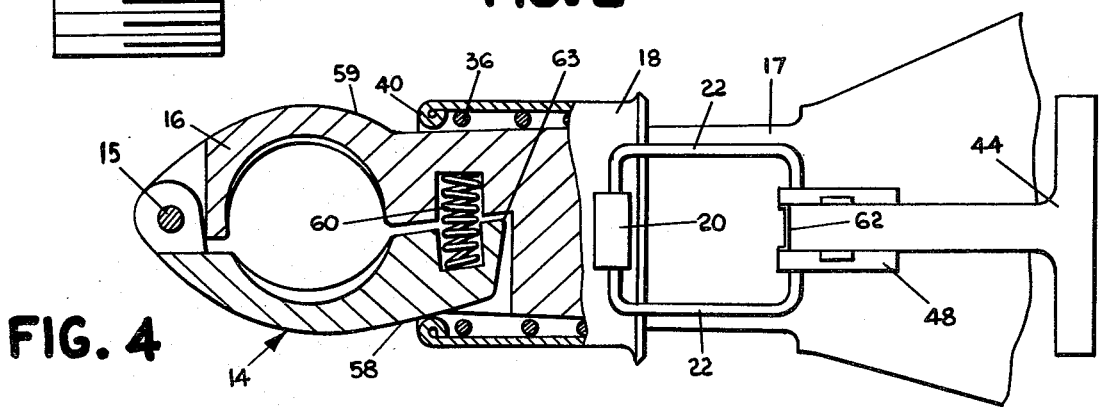
FIG. 4 is a partially sectioned top elevational view of the coupler along lines 4—4 of FIG. 2.

To the rear of the body and rigidly secured thereto, is a tongue portion 17. Typically, the tongue is flared in a horizontal plane as shown in FIG. 4 to match mounting brackets (not shown) on a trailer (not shown). The ball 12 is secured to the rear of a vehicle (not shown).

Figure 2:
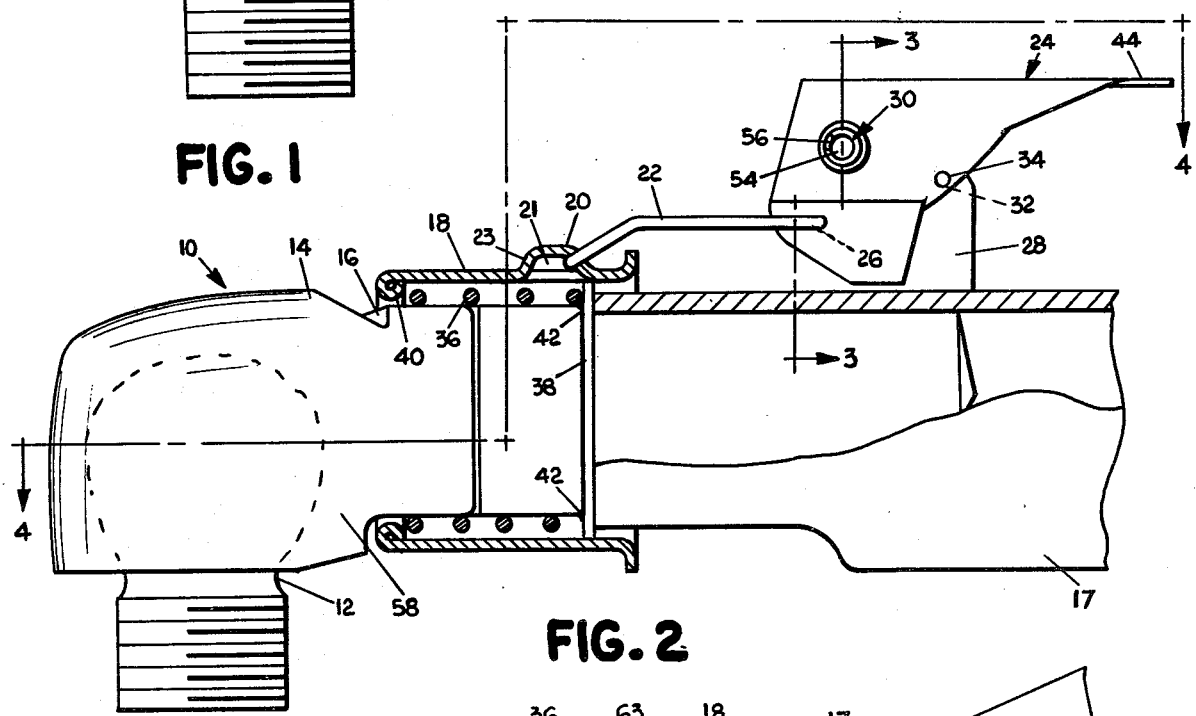
FIG. 2 is a partially sectioned view of the coupler as shown in FIG. 1 with the handle in the first position.

A collar 18 is slidably mounted on the back portion of the body 16 for movement between an unlatched position shown in FIG. 1 to a latched position shown in FIG. 2. A top portion of the collar 18 has a raised ridge 20 having a slot 21 therethrough. Pivotably positioned through the slot 21 is a rod 22. As shown in FIG. 4, the rod extends through the slot 21 and is bent rearwardly at both sides of the ridge 20.

The other end of the rod 22 is pivotally connected to a handle 24 through aperture 26. The rod as shown in FIG. 4 has its inner ends 23 bent forward to secure engagement of the rod 22 to the handle 24. The handle 24 is mounted onto a vertical mounting flange 28 at pivot point 30. The vertical mounting flange 28 is rigidly secured by welding to the tongue 17. The vertical mounting flange 28 has an aperture 32 therethrough at a rear portion thereof. Handle 24 has an aperture 34 therethrough.

Referring particularly to FIG. 2, the handle 24 is shown in a first or latched position. The collar 18 is biased toward a forward latching position by a coil spring 35 which abuts a retaining ring 38 at the rear portion of the spring and a rolled end 40 of a collar 18 at the front portion of the spring. The retaining ring 38 is fixed in position between the forward end of the tongue 17 and a shoulder 42 on the body 16. The tongue 17 is secured to the back portion of the body 16 in a conventional fashion such as by rivets, welding, and the like. When the handle 24 is in the first or latched position, the aperture 34 is aligned with aperture 32 in the flange.

Figure 3:
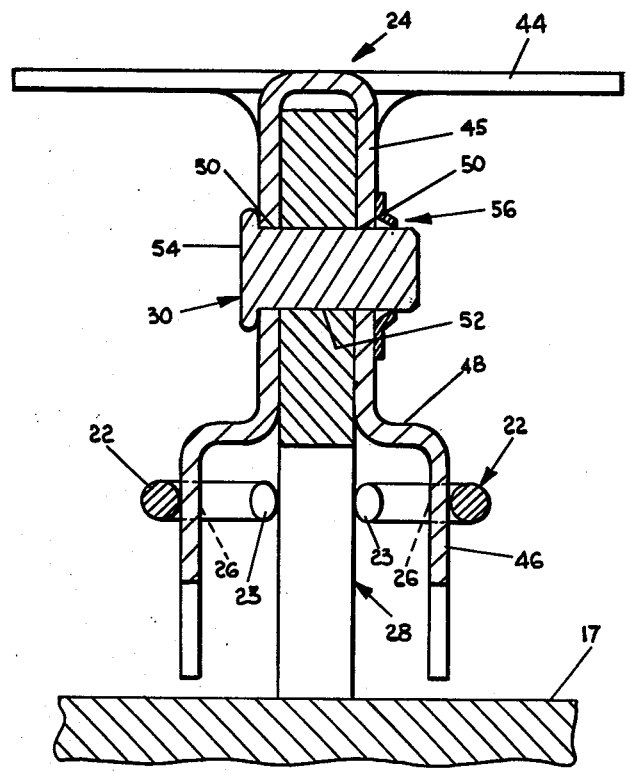
FIG. 3 is an enlarged sectional view taken along the lines 3—3 of FIG. 2.

Referring particularly to FIG. 3, the handle 24 has an upper lever portion 44, and middle and lower portions 45, and portion 46 respectively which extend vertically downward on both sides of the mounting flange 28. An outwardly extending shoulder 48 is between the middle and lower portions. The middle portion 45 slidably abuts the vertical mounting flange 28. Aperture 50 extends through the middle portion 45 on both sides of flange 28 and, as clearly shown in FIG. 2, align with aperture 52 in the flange 28. A stud 54 is positioned through both apertures 50 and aperture 52 and is retained therein by a push nut 56 engaging the stud 54. The rod 22 passes through apertures 26 located in the lower portion 46 on both sides of the vertical support flange 48. The rod 22 has its inner ends 23 bent forward to secure engagement of the rod 22 with the lower portion 46.

Referring particularly to FIG. 4, the outer surface 58 of the back end of the cap 14 and the outer surface 59 of the body slant outwardly and forwardly so that the cap 14 and body 16 are forced together as the collar 18 slides to its forward latching position. The rolled end 40 of the collar abuts the two outer surfaces 58 and 59 when the collar is in the latching position. A spring 60 is positioned between the cap 14 and body 16 so that when the collar is in a releasing position, the cap 14 will automatically spring open. The handle 24 has a front ridge 62 extending between the top edge of the two middle portions 45.

In operation, the handle is manually movable between a first position illustrated in FIG. 2 and a second position illustrated in FIG. 1. As shown in FIG. 2, when the handle is in the first or latching position, the collar is forced to a latching position wherein the collar latches the cap 14 in a closed position with respect to a body 15. On the other hand, when the handle is in the second or unlatched position, the collar is withdrawn as shown in FIG. 1 so that the cap can be rotatably separated from the body.

The tapered outer surfaces 58 and 59 of the cap 14 and body 16 permit the cap to adjust for variations in the ball and coupler dimensions and for wear therebetween. The collar 18 slides forward over the outer surface 58 and 59 until a given resistance is met. The cap 14 and body 16 are forced closer together by the collar 18. As the ball 12 or the interior surfaces of the cap meet, the interior surface of the body and cap attain a closed position.

When the exterior surfaces 58 and 59 of the cap and body are positioned farther out, due to a variation in the ball size or thickness of the cap or body, the collar 18 is at a slightly rearward latching position, and rod 22 is positioned closer to the front edge 23 of slot 21. A pin or padlock (not shown) may be positioned through both aperture 32 and aperture 34 so that the handle is locked in the first position and the coupler is locked in a closed position around ball 12.

When handle 24 is moved to a second position as shown in FIG. 1, the apertures 26 are moved rearwardly so that the rod 22 pulls collar 18 rearwardly to a releasing position. The spring 60 as shown in FIG. 4 automatically opens the cap when the collar is in this position. A pin or padlock, when desired, can be placed through aperture 32 in the vertical mounting flange 28 to maintain the handle 24 in the second position so that the collar 18 remains in the releasing position.

One advantage of this embodiment is that the collar can automatically latch the cap when the cap is closed. The spring coil 36 slides the collar to the latching position and handle 24 is pivoted to the first position. This advantage is particularly desirable in couplers which limit the cap movement such that the back inner corner 63 of the cap (as shown in FIG. 4) cannot extend farther than the surface of the collar. In such couplers, the collar typically rests against the corner 63 of the cap. If the handle is maintained in the latching position by a pin inserted through aperture 32, then the collar will remain in its rearward releasing position and not automatically latch the cap.

Figure 5:
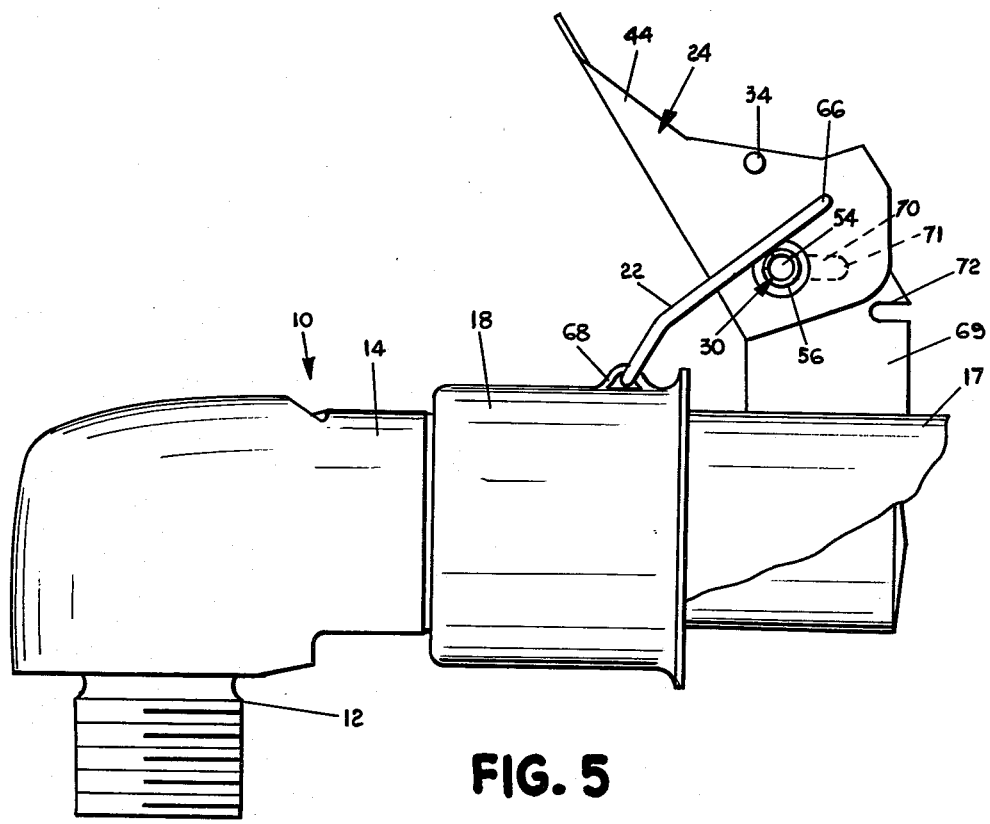
FIG. 5 is a side elevational view of a second embodiment of the coupler with the handle in the second position.

In a second embodiment as disclosed in FIG. 5, the rod 22 is connected to the handle 24 at point 66 so as to create an over-center linkage for the handle. Unless indicated otherwise, like numerals have been used to designate like parts.

Rod 22 is positioned through aperture 68. Stud 54 extends through apertures 50 in handle 24 and through slot 70 in flange 69. A notch 72 extends through flange 69.

When the handle 24 is in the latching position, aperture 34 aligns with notch 72. A pin or padlock (not shown) can be placed through aperture 34 and in notch 72 to secure the handle in the latched position.

When the collar 18 is slightly positioned rearwardly due to variation in thickness of the ball or thickness of the cap or body, the handle 24 is correspondingly positioned rearward so that stud 54 is closer to the rear end 71 of slot 70. The pin or padlock is also positioned closer to the open end of notch 72.

When the handle is in the unlatched position, the rod 22 is positioned at the upper side of the axis of pivot point 30. The coil spring 36 exerts a forward force on rod 22. The rod 22 in turn exerts a forward force on handle 24 which applies a torque on handle 24 toward the second position. The front ridge 62 abuts the front edge of the flange to limit the pivotable movement of the handle 24. The handle 24 remains in the second position to allow an operator to free both his hands. The handle 24 can be manually moved back down to the first position which moves the collar to the latching position.

Thus, in the second embodiment, the coil spring 36, in conjunction with the rod 22, acts as a toggle mechanism on handle 24. When the handle is in the second position, the rod 22, in conjunction with the coil spring 36, maintains the handle in the second position, and when the handle is in the first position, the rod 22, in conjunction with the coil spring, maintains the handle in the first position.

One of the principal features of the invention is the handle 24 can be in the first position only when the collar 18 is in the latching position. Secondly, the handle 24 can be in the second position only when the collar is in the releasing position. The handle 24, as such, serves as a convenient visual indicator to tell an operator whether the collar is latching the cap in the closed position.

Another feature of the invention is that the collar can adjust for variations in the coupler. Even though the handle controls whether the collar is in the latching or releasing position, the handle and coupling between the collar and handle do not interfere with the automatic adjustment of the collar when in the latching position.

Another feature of the invention is that the handle maintains the collar in the releasing position until the operator desires to latch the cap.

Reasonable variation and modification are possible within the scope of the foregoing disclosure, the drawings, and the appended claims without departing from the spirit of the invention.

The embodiments of the invention in which an exclusive property or privilege is claimed are defined as follows:

1. In a coupler for a trailer wherein a ball is secured to one of either a vehicle or a trailer and the coupler is secured to the other of said vehicle or trailer, said coupler has a body and cap hinged together at a front portion so that the cap pivots about a front portion of the body, the body has means for mounting the coupler to a trailer or vehicle at a rear portion thereof, said body and cap being closable along parting faces thereof, each of said body and cap having internal recesses forming a cavity for said ball when the body and cap are closed along parting faces thereof, at least one of the body and cap having side surfaces tapering inwardly and rearwardly, a collar mounted for axial movement along the body for releasably latching said cap in a closed position to a said body, the collar having a front portion bearing against the tapered side surface when the collar is in a forward position, and means biasing the collar to the latching position, the improvement which comprises:
a handle;
means mounting the handle to the coupler mounting means for movement between a first position and a second position;
means for coupling the handle to the collar such that the collar is in a latching position only when the handle is in the first position and the collar is in a release position only when the handle is in the second position; and
means for permitting slight axial adjustment of the collar when the collar is in the latching position and the handle is in the first position; whereby the collar automatically compensates for variations in ball size, cap and body thickness and taper to maintain the cap tightly latched to the body.

2. A coupler according to claim 1 wherein the mounting means mounts the handle for pivotable movement with respect to the coupler mounting means.

3. A coupler according to claim 1 wherein the handle coupling means comprises:
a flange extending transversely from the coupler mounting means; and
the axial adjustment means comprises a slot extending through the flange and having a longitudinal axis parallel to a longitudinal axis of the coupler;
the handle being pivotably mounted to the flange at the slot so that the handle can move along the longitudinal axis of the slot.

4. A coupler according to claim 3 wherein the coupling means comprises:
a rod pivotably mounted to the collar, the rod pivotably mounted to the handle at a point spaced from the point where the handle is pivotably mounted to the coupler mounting means such that the rod moves the collar to a latching position and releasable position respectively when the handle is moved to the first and second respective positions.

5. A coupler according to claim 4 further comprising means for releasably maintaining the handle in the second position.

6. A coupler according to claim 5 wherein the maintaining means includes the rod pivotably mounted on the handle at a position such that the biasing means provides a toggle linkage on the handle whereby the rod exerts a force on the handle toward the first position when the handle is substantially in the first position and exerts a force on the handle toward the second position when the handle is substantially in the second position.

7. A coupler according to claim 5 wherein the maintaining means includes an aperture through the flange positioned to receive a fastening means when the handle is in the second position such that the fastening means abuts and secures the handle in the second position.

8. A coupler according to claim 7 wherein the aperture is positioned in the flange to receive the fastening means when the handle is in the first position such that the fastening means abuts and secures the handle in the first position.

9. A coupler according to claim 1 further comprising a toggle means for releasably maintaining the handle in the second position.

10. A coupler according to claim 1 wherein the axial adjustment means comprises an elongated slot means formed in said collar and said coupling means is slidably mounted in said elongated slot means.

* * * * *